(12) United States Patent
Jiang et al.

(10) Patent No.: US 12,481,080 B2
(45) Date of Patent: Nov. 25, 2025

(54) METHOD FOR THREE-DIMENSIONAL VELOCITY GEOLOGICAL MODELING WITH STRUCTURES AND VELOCITIES RANDOMLY ARRANGED

(71) Applicants: SHANDONG UNIVERSITY, Shandong (CN); SHANDONG HI-SPEED GROUP CO., LTD., Shandong (CN)

(72) Inventors: Peng Jiang, Jinan (CN); Yuxiao Ren, Jinan (CN); Qifeng Wang, Jinan (CN); Zhiwu Zuo, Jinan (CN); Xinji Xu, Jinan (CN); Kai Wang, Jinan (CN); Lei Chen, Jinan (CN); Chuanyi Ma, Jinan (CN); Shuai Cao, Jinan (CN); Senlin Yang, Jinan (CN); Qingyang Wang, Jinan (CN); Xianglong Meng, Jinan (CN)

(73) Assignees: SHANDONG UNIVERSITY, Jinan (CN); SHANDONG HI-SPEED GROUP CO., LTD., Jinan (CN)

( * ) Notice: Subject to any disclaimer, the term of this patent is extended or adjusted under 35 U.S.C. 154(b) by 415 days.

(21) Appl. No.: 18/031,693

(22) PCT Filed: Oct. 15, 2021

(86) PCT No.: PCT/CN2021/124210
§ 371 (c)(1),
(2) Date: Apr. 13, 2023

(87) PCT Pub. No.: WO2022/078514
PCT Pub. Date: Apr. 21, 2022

(65) Prior Publication Data
US 2023/0384470 A1    Nov. 30, 2023

(30) Foreign Application Priority Data
Oct. 15, 2020 (CN) .......................... 202011105341.7

(51) Int. Cl.
*G01V 1/28* (2006.01)
(52) U.S. Cl.
CPC ...... *G01V 1/282* (2013.01); *G01V 2210/6222* (2013.01); *G01V 2210/642* (2013.01); *G01V 2210/66* (2013.01)
(58) Field of Classification Search
CPC .......... G01V 1/282; G01V 2210/6222; G01V 2210/642; G01V 2210/66; G01V 20/00
See application file for complete search history.

(56) References Cited

U.S. PATENT DOCUMENTS

2023/0384470 A1\* 11/2023 Jiang ...................... G01V 20/00

FOREIGN PATENT DOCUMENTS

CN    101582173 A    11/2009
CN    106934860 A    7/2017
(Continued)

OTHER PUBLICATIONS

Jan. 6, 2022 International Search Report issued in International Patent Application No. PCT/CN2021/124210.
(Continued)

*Primary Examiner* — Daniel Pihulic
(74) *Attorney, Agent, or Firm* — Oliff PLC (57) ABSTRACT

A method for three-dimensional velocity geological modeling with structures and velocities randomly arranged, including determining base points in three-dimensional space, building equation according to the base points to determine planar layered model, complicating a tilt layer of planar layered model, and building a fold layer model of a surface in three-dimensional space; building three-dimensional fault folded model based on the three-dimensional surface fold layer model combined with a fault plane of a random reference point and displacement of each point in a global coordinate system; building a velocity model con-
(Continued)

taining a salt body based on the three-dimensional fault folded model, and simulating salt body intrusion in a geological body of a certain depth; and performing a random velocity amplitude to realize three-dimensional velocity modeling according to the layered type which has been set and according to the set velocity range and the velocity difference range between each layer of geology.

13 Claims, 6 Drawing Sheets

(56) References Cited

FOREIGN PATENT DOCUMENTS

| CN | 108693572 | A | | 10/2018 | | |
|---|---|---|---|---|---|---|
| CN | 110297272 | A | | 10/2019 | | |
| CN | 112415582 | A | * | 2/2021 | ............. | G01V 1/282 |
| CN | 112415582 | B | * | 7/2022 | ............. | G01V 1/282 |
| EP | 2 447 916 | A1 | | 5/2012 | | |
| WO | 2014/126959 | A2 | | 8/2014 | | |
| WO | WO-2022078514 | A1 | * | 4/2022 | ............. | G01V 1/282 |

OTHER PUBLICATIONS

Jan. 6, 2022 Written Opinion issued in International Patent Application No. PCT/CN2021/124210.

Aug. 3, 2021 Office Action issued in Chinese Patent Application No. 202011105341.7.

Jiang, Xianyi, "The Study of Seismic Acquisition Method Based on Modeling of 2D and 3D Complex Geologic Structure", Chinese Doctoral Dissertations & Master's Theses Full-text Database (Doctor), Basic Sciences, Dec. 15, 2004, pp. 91-92.

Wu et al., "An effective method for 3D geological modeling with multi-source data integration", Computers & Geosciences, vol. 31, 2005, pp. 35-43.

\* cited by examiner

METHOD FOR THREE-DIMENSIONAL VELOCITY GEOLOGICAL MODELING WITH STRUCTURES AND VELOCITIES RANDOMLY ARRANGED

TECHNICAL FIELD

The present disclosure is in the technical field of geophysical exploration, and relates to a method for three-dimensional velocity geological modeling with structures and velocities randomly arranged.

BACKGROUND

The description in this section merely provides background information related to the present disclosure and does not necessarily constitute the related art.

During tunnel excavation, there may be geological disasters such as inrush of water and mud, collapse and so on; the engineering accidents such as Tunnel Boring Machine (IBM) clamping impose great challenges to the tunnel construction, resulting in construction risks, casualties and economic losses. Therefore, geologic forward prospecting is a key step of tunnel construction, and geophysical exploration method is the mainstream geologic forward prospecting method. As one of the most used geophysical exploration methods, a seismic method is widely used in petroleum exploration, coal field, metal ore exploration and so on, which has broad application prospects. In tunnel forward prospecting, the seismic method is also the earliest and most widely used geophysical method. The main principle of seismic method is based on wave field propagation, where a number of receivers are placed on the ground, a wave field is generated by multiple excitations of artificial seismic source and propagated in the underground medium. When the wave impedance changes in the underground medium, reflection or refringence is generated and returned to the surface, the receivers located on the surface record the seismic information propagated to the surface, the seismic data are processed by imaging or inversion methods to obtain distribution information of the underground medium.

Modeling the geological interface is an important step in geophysical exploration methods. As can be appreciated by the inventor, the velocity model building method based on deep learning is a popular method at present, and achieves better results. However, at present, there is only several simple two-dimensional velocity model design methods for deep learning-based velocity inversion, and there remains a lack of an automated three-dimensional velocity model building method. In addition, there remains a lack of technique for the method for using deep learning and exploratory data to build a velocity model in front of the tunnel, and there are some problems in tunnel three-dimensional observation system, such as difficult encoding and large parameters of three-dimensional velocity model.

However, in a tunnel environment, there remains a lack of velocity model building of tunnel using a deep learning method which achieves building of the two-dimensional geological velocity model with only reference to the surface mode, for which we propose an entire flow process of seismic velocity model building based on the deep learning method.

The flow process mainly includes:
1. specific parameters are determined, and a large number of three-dimensional velocity models of a tunnel is built;
2. three-dimensional forward modeling is performed to obtain seismic data;
3. the deep neural network is used for learning the mapping relationship between seismic data and velocity and parameters of the tunnel model, and the velocity model is obtained to build the network.

The method for velocity model building based on deep learning is a data-driven algorithm, which is essentially to build a mapping relationship from a geologic velocity model to the observation data through a large amount of data. If a large amount of data cannot be obtained, performance of the algorithm will be greatly reduced. Therefore, the method imposes high demands on data acquisition. At present, building a reasonable model and obtaining data through forward simulation is a common method, the existing velocity model methods which are mainly used for ground detection modeling lack tunnel modeling methods, and manual model building methods and two-dimensional batch velocity model methods are used instead, and these methods have the following problems:

first, the modeling cost is too high;
according to traditional modeling methods, the building of complex velocity model usually relies on the professional knowledge of geological interpretation of seismic exploration data in a certain subsurface region of the earth, and then the velocity model for that region is built. In the model building process, a large number of labeled data sets cannot be used to train a deep learning inversion network due to the huge human workload and cost.

Secondly, the complexity of the model is low;
the existing batch velocity modeling methods are mainly based on two-dimensional velocity model, and the two-dimensional simple layer or fault model is mainly built, which is inconsistent with the actual geological conditions; the complexity of the model is too low, and there is no plan to build a salt-body model, which is not enough to simulate the actual geological conditions, directly leading to the poor effect of the neural network obtained by deep learning method when faced with more complex actual models.

The major difficulties in building velocity models are as follows:
(1) a reasonable algorithm and function are needed to randomly build a reasonable velocity model;
geological model is formed through geological movement with great randomness and regionality, as well as geological history information; therefore, it is difficult to generate a velocity model which can simulate the real geological information by function, which needs to conform to the general law of strata and have enough randomness to avoid model repetition.
(2) It is difficult to achieve fast modeling while ensuring model complexity;
when building a model, the parameters need to be randomly taken, and the velocity model should be generated within a reasonable range, the complexity of the model needs to be guaranteed, which puts forward higher requirements for parameter selection, and it becomes more difficult to further realize rapid random velocity model.

In an aspect of deep learning modeling, the existing methods are mainly used for the ground and tunnel modeling in the two-dimensional environment, but there are no three-dimensional tunnel deep learning modeling methods proposed.

SUMMARY

In order to solve the above-mentioned problems, the present disclosure provides a method for three-dimensional velocity geological modeling with structures and velocities randomly arranged: According to the present disclosure, for the problem of lack of a deep neural network and lack of a training data set, three-dimensional velocity models are built in random batches to fill in the blanks in building the three-dimensional velocity models at present. The data set is enlarged, which greatly enhances an inversion effect of the deep learning method.

According to some embodiments, the following technical solution is used for the present disclosure:

A method for three-dimensional velocity geological modeling with structures and velocities randomly arranged, including:

determining base points in a three-dimensional space, building an equation according to the base points to determine a planar layered model, complicating a tilt layer of the planar layered model, and building a fold layer model of a surface in the three-dimensional space;

building a three-dimensional fault folded model based on the three-dimensional surface fold layer model combined with a fault plane of a random reference point and displacement of each point in a global coordinate system;

building a velocity model containing a salt body based on the three-dimensional fault folded model, and simulating salt body intrusion in a geological body of a certain depth; and performing a random velocity amplitude to realize three-dimensional velocity modeling according to the layered type which has been set and according to the set velocity range and the velocity difference range between each layer of geology.

As an alternative embodiment, the specific process of building an equation to determine a planar layered model according to the base points includes:

an equation is built according to the base points $(X_{ref}, Y_{ref}, Z_{ref})(X_{ref}, Y_{ref}, Z_{ref})$ to determine the planar layered model, and the calculation formula is as follows:

$$H(X,Y)=(X-X_{ref})+(Y-Y_{ref})\tan \varphi,$$

where $\varphi$ represents an angle of tilt.

As an alternative embodiment, the complicating a tilt layer of the planar layered model specifically includes: the planar layered model is determined by building an equation according to the base points, and the different layer models are divided into different categories; a fluctuation function is built for each point based on the plane model; by adjusting a period and amplitude of a trigonometric function in the fluctuation function, a tilt term is built for the surface, the tilt layer is further complicated, and the fold layer model of the surface in the three-dimensional space is built.

As a further limitation, the specific process includes:

a folded model is built based on the planar layered model, and the calculation formula is as follows:

$$S(X, Y) = \begin{cases} A_1 \cos(2\pi H/T_1) - A_1 & H \leq \hat{T}_1 \\ A_i \cos(2\pi H/T_i) - A_i & \hat{T}_{i-1} < H \leq \hat{T}_i, \\ A_n \cos(2\pi H/T_n) - A_n & H > \hat{T}_{n-1} \end{cases}$$

where $T_i$ $A_i$ represents the period and amplitude respectively, and the values are randomly taken;

a tilt term formula for the surface is built as: $D(X,Y)=b_1(X-X_{ref})=b_2(Y-Y_{ref})$, where $X_{ref}, Y_{ref}$ are base point coordinates, and the value of $b_1$ $b_2$ is randomly taken.

As an alternative embodiment, the specific process of building a three-dimensional fault folded model includes:

the formula for adding faults to the folded model is as follows:

$$c_1(X-X_{ref})+c_2(Y-Y_{ref})+c_3(Z-Z_{ref})=0,$$

where $c_1$ $c_2$ $c_3$ are calculated by a rotation matrix:

$$\begin{bmatrix} c_1 \\ c_2 \\ c_3 \end{bmatrix} = R \begin{bmatrix} 0 \\ 0 \\ 1 \end{bmatrix} = \begin{bmatrix} \cos\phi \sin\theta \\ \sin\phi \sin\theta \\ -\cos\theta \end{bmatrix},$$

a rotation matrix $$R = \begin{bmatrix} \sin\phi & \cos\phi\cos\theta & \cos\phi\sin\theta \\ \cos\phi & -\sin\phi\cos\theta & \sin\phi\sin\theta \\ 0 & \sin\theta & -\cos\theta \end{bmatrix},$$

where $\phi\theta$ are randomly take n from $[0,2\pi]$, and for random $d_x$ $d_y$, $D_X$ $D_Y$ $D_Z$ have $$\begin{bmatrix} D_X \\ D_Y \\ D_Z \end{bmatrix} = R \begin{bmatrix} d_x \\ d_y \\ 0 \end{bmatrix} = \begin{bmatrix} d_x \sin\phi + d_y \cos\phi \cos\theta \\ d_y \cos\phi + d_y \sin\phi \cos\theta \\ d_y \sin\theta \end{bmatrix}$$

in the global coordinate.

As an alternative embodiment, the specific process of simulating an upward salt body intrusion in a geological body of a certain depth includes: the intrusion is fitted by a two-dimensional Gaussian function, the height of vertical intrusion is defined by an amplitude, the size is determined by variances, and the direction is determined by a clockwise rotation angle; an affected area with a certain thickness is set, the maximum intrusion height is in at the bottom stratum, the closer to the surface in the affected area, the smaller the influence, while the stratum above the affected area remains unchanged, and a salt body is added.

As a further limitation, the formula for building a salt body is as follows:

$$G(X,Y)=A \exp(-(d_1(X-X_{ref})^2+d_3(Y-Y_{ref})^2+2d_2(X-X_{ref})(Y-Y_{ref}))),$$

where $$d_1 = \frac{\cos^2\theta}{2\sigma_X^2} + \frac{\sin^2\theta}{2\sigma_Y^2}, d_2 = -\frac{\sin 2\theta}{4\sigma_X^2} + \frac{\sin 2\theta}{4\sigma_Y^2}, d_3 = \frac{\sin^2\theta}{2\sigma_X^2} + \frac{\cos^2\theta}{2\sigma_Y^2}$$

A represent the height of a vertical intrusion of the salt body, and the size of the salt body is controlled by $\sigma_X^2$ $\sigma_Y^2$; an affected area of the salt body is set as $[A_{max}+5, A_{max}+15]$, where $A_{max}$ represents the maximum intrusion height; in the affected area, the shallower the layer, the smaller the amplitude A of the corresponding Gaussian function, and the stratum above the affected area remains unchanged.

As an alternative embodiment, the specific process of performing a random velocity amplitude to achieve three-dimensional velocity modeling includes:
  generating a vector V' of n+1 elements randomly according to the number of layers n;
  generating a vector $V_1$ by accumulating the vector V';
  taking a random velocity reference value M, M∈[$x_1,x_2$] and $x_1,x_2$ as the upper and lower bounds of velocity;
  taking the last element $v_{end}$ $V_1$;
  evaluating the velocity as V=($V_1/v_{end}$)·M; and
  taking velocity $V_{salt\ body}$, $V_{salt\ body}$∈[M,M+Δv] randomly for the body, where Δv is a randomly added velocity value.

As an alternative embodiment, in the process of three-dimensional velocity modeling, the earth surface folded model is rotated by 90° counterclockwise along a central axis to determine fault strike, stratum thickness and velocity distribution range planned according to geological conditions from a geological survey report before tunneling, and the weight of the modeling parameters in different ranges is set.

As an alternative embodiment, the method for three-dimensional velocity geological modeling with structures and velocities randomly arranged further includes acquiring a tunnel seismic record, performing feature extraction processing on the tunnel seismic record using a convolutional neural network, and adding tunnel receiver position information on an additional channel to complete data encoding.

As an alternative embodiment, a convolutional neural network is used to decode the encoded data, multi-objective learning is performed, and a three-dimensional velocity model and three-dimensional velocity modeling parameters are obtained by respectively processing the decoding results of the decoder using a convolutional neural network and a fully connected neural network.

As an alternative embodiment, in the process of building a velocity model, the loss function used includes a velocity model loss function and a modeling parameter loss function, where the velocity model loss function is used for fitting a real three-dimensional velocity model corresponding to the observation data and a network modeling three-dimensional velocity model. The modeling parameter loss function is used to fit the real three-dimensional velocity model modeling parameters corresponding to the Observation data with the network modeling parameters.

A computer-readable storage medium having stored therein a plurality of instructions adapted to be loaded by a processor of a terminal device and to perform the method for three-dimensional velocity geological modeling with structures and velocities randomly arranged.

A terminal device including a processor and a computer-readable storage medium, where the processor is used for implementing various instructions; the computer-readable storage medium is used to store a plurality of instructions adapted to be loaded by a processor and to perform the method for three-dimensional velocity geological modeling with structures and velocities randomly arranged.

Compared to the related art, the beneficial effects of the present disclosure are:
  the present disclosure deals with three-dimensional velocity modeling in geological modeling: considering that there is no three-dimensional velocity modeling method, a three-dimensional velocity modeling method is provided, which generates a velocity model conforming to the real geology through function simulation.
  In addition, the present disclosure also provides a batch modeling method. Considering that the original geological modeling method has the problem of being unable to perform batch modeling, writing an algorithm using MATLAB software greatly improves the modeling velocity, and forms an available batch modeling method, so that the data set performing three-dimensional velocity inversion using the deep learning method is greatly increased, and the accuracy of velocity inversion using the deep learning method can be effectively improved.

According to the present disclosure, for the problem of not performing salt body simulation in traditional modeling, function fitting is carried out for the salt body, a concept of influence layer is provided, and reasonable simulation is performed for the salt body in deep geology, so that the modeling result is closer to real geology.

The present disclosure provides a tunnel three-dimensional velocity parameterization batch modeling method, by which a three-dimensional velocity model is built according to the pre-survey results of tunnel construction, and the model is highly consistent with engineering geological conditions.

In view of the lack of available deep learning tunnel three-dimensional velocity modeling methods, the present disclosure provides a new tunnel three-dimensional velocity model building method, detector and source point location information encoding is added in the data, and a multi-task learning mode is used to optimize network parameters to effectively improve the modeling accuracy.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

DETAILED DESCRIPTION

The present disclosure is further described below with reference to the accompanying drawings and embodiments.

It should be noted that the following detailed descriptions are all exemplary and are intended to provide a further description of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "include" and/or "include" used in this specification indicate that there are features, steps, operations, devices, components, and/or combinations thereof.

Figure 1:
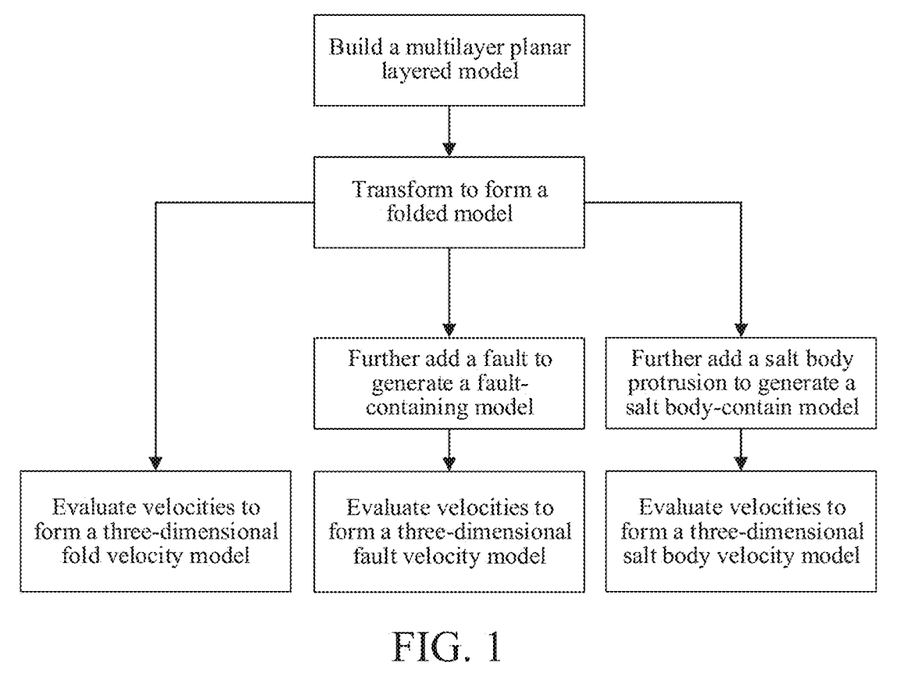
FIG. 1 is a flowchart of a method according to an embodiment of the present disclosure.
Figure 2:
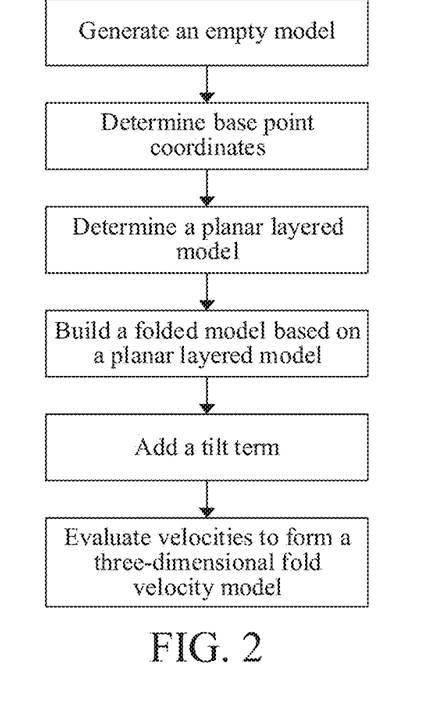
FIG. 2 is a folded model modeling flowchart according to an embodiment of the present disclosure.

As shown in FIG. 1, the three-dimensional velocity modeling method further includes:

Step S1: Determining base points in a three-dimensional space, building an equation to determine a planar layered model according to the base points, building a fluctuation function for each point based on the plane model, and further building a tilt term for a surface by adjusting the period and amplitude of a trigonometric function in the fluctuation function, further complicating the tilt layer, and building a fold layer model of the surface in the three-dimensional space, as shown in FIG. 2;

the size of the model according to the embodiment is nx×ny×nz, such that an x-layer layered model is generated.

In this example, the planar layered model is determined by building an equation according to the base points ($X_{ref}$, $Y_{ref}$, $Z_{ref}$), and the calculation formula is as follows:

$$H(X,Y) = (X - X_{ref}) + (Y - Y_{ref}) \tan \varphi$$

in this example, a folded model is built based on the planar layered model, and the calculation formula is as follows:

$$S(X, Y) = \begin{cases} A_1 \cos(2\pi H/T_1) - A_1 & H \le \hat{T}_1 \\ A_i \cos(2\pi H/T_i) - A_i & \hat{T}_{i-1} < H \le \hat{T}_i \\ A_n \cos(2\pi H/T_n) - A_n & H > \hat{T}_{n-1} \end{cases}$$

in this example, the tilt term formula for the surface is built as:

$$D(X,Y) = b_1(X - X_{ref}) + b_2(Y - Y_{ref}).$$

Figure 3:
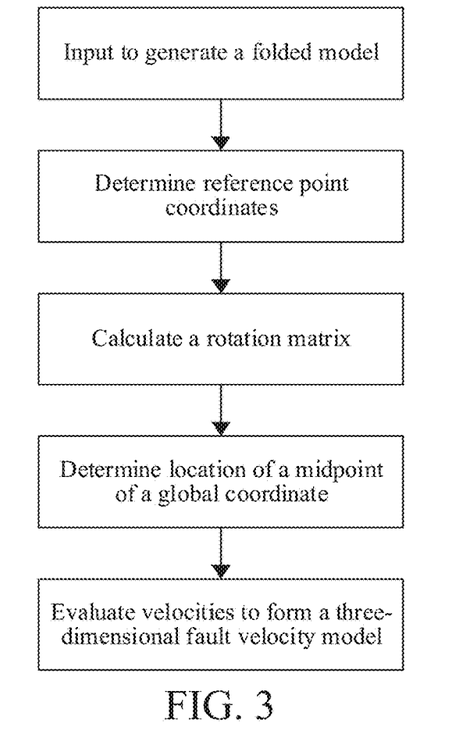
FIG. 3 is a fault model modeling flowchart according to an embodiment of the present disclosure.

Step S2: Based on the built three-dimensional surface fold layer model, building an equation via a determined random reference point, determining a fault plane passing through the reference point, and then determining displacement of each point in a global coordinate system via a rotation matrix, and building a three-dimensional fault folded model, as shown in FIG. 3;

the formula for building the fault model in this embodiment is as follows:

$$c_1(X - X_{ref}) + c_2(Y - Y_{ref}) + c_3(Z - Z_{ref}) = 0,$$

where $c_1 c_2 c_3$ are calculated by a rotation matrix:

$$\begin{bmatrix} c_1 \\ c_2 \\ c_3 \end{bmatrix} = R \begin{bmatrix} 0 \\ 0 \\ 1 \end{bmatrix} = \begin{bmatrix} \cos\phi \sin\theta \\ \sin\phi \sin\theta \\ -\cos\theta \end{bmatrix},$$

a rotation matrix $$R = \begin{bmatrix} \sin\phi & \cos\phi\cos\theta & \cos\phi\sin\theta \\ \cos\phi & -\sin\phi\cos\theta & \sin\phi\sin\theta \\ 0 & \sin\theta & -\cos\theta \end{bmatrix},$$

where $\phi\theta$ are randomly taken from $[0,2\pi]$.

Figure 4:
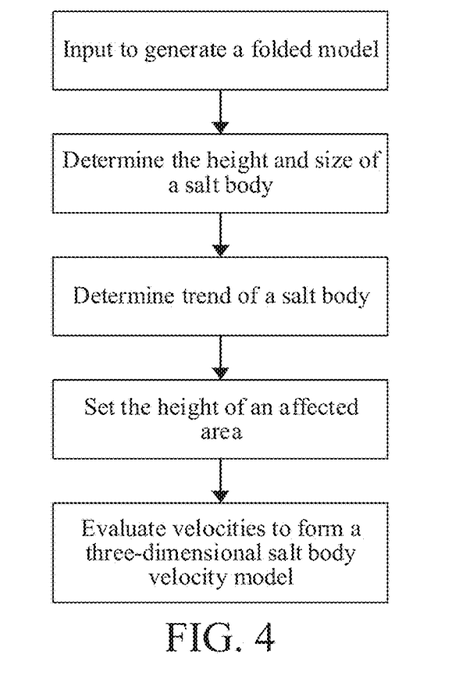
FIG. 4 is a salt-body model modeling flowchart according to an embodiment of the present disclosure.

Step S3: Building a velocity model containing a salt body based on a folded model, as shown in FIG. 4, simulating an upward intrusion of the salt body in a geological body with a certain depth, and fitting the intrusion by a two-dimensional Gaussian function, where the height of the vertical intrusion is defined by an amplitude, and the size is determined by variances $\sigma_x$ and $\sigma_y$, and the direction is determined by a clockwise rotation angle $\theta$. Since the salt body has a small influence on the upper layer, an affected area with a certain thickness is set, the maximum intrusion height is in at the bottom stratum, the closer to the surface in the affected area, the smaller the influence, while the stratum above the affected area remains unchanged, and a salt body is added.

The formula for building the salt body in this example is as follows:

$$G(X,Y) = A \exp(-(d_1(X - X_{ref})^2 + d_3(Y - Y_{ref})^2 + 2d_2(X - X_{ref})(Y - Y_{ref}))),$$

where $$d_1 = \frac{\cos^2\theta}{2\sigma_X^2} + \frac{\sin^2\theta}{2\sigma_Y^2}, d_2 = -\frac{\sin 2\theta}{4\sigma_X^2} + \frac{\sin 2\theta}{4\sigma_Y^2}, d_3 = \frac{\sin^2\theta}{2\sigma_X^2} + \frac{\cos^2\theta}{2\sigma_Y^2}$$

Figure 5A:
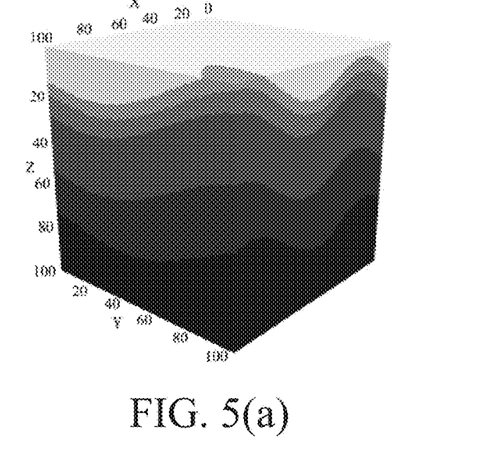
FIG. 5(a) to FIG. 5(c) are schematic diagrams of a layered model, a fault model, and a salt-body model, respectively.
Figure 5B:
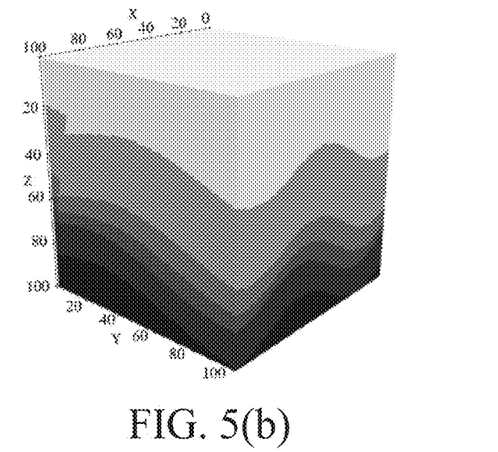
Figure 5C:
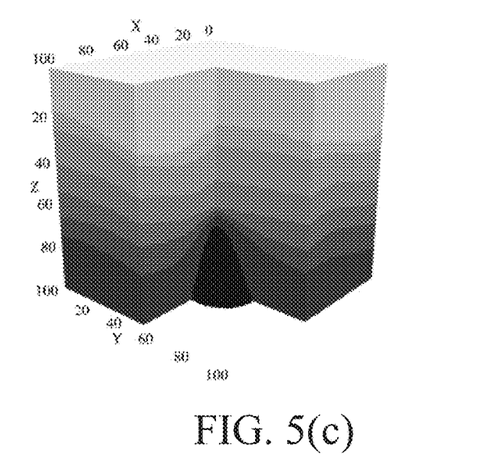

A represent the height of a vertical intrusion of the salt body, and the size of the salt body is controlled by $\sigma_X^2$ $\sigma_Y^2$; an affected area of the salt body is set as $[A_{max}+5, A_{max}+15]$, where $A_{max}$ represents the maximum intrusion height; in the affected area, the shallower the layer, the smaller the amplitude A of the corresponding Gaussian function, and the stratum above the affected area remains unchanged. As shown in FIG. 5(a) to FIG. 5(c), a layered model, a fault model, and a salt-body model are shown, respectively.

Step S4: Randomly evaluating the velocity to each layer based on the built model.

The velocity evaluating procedure is as follows:
1. generating a vector V' of n+1 elements randomly according to the number of layers n;
2. generating a vector $V_1$ by accumulating the vector V';
3. taking a random velocity reference value M, $M \in [x_1, x_2]$ ($x_1, x_2$ is the upper and lower bounds of velocity, which is taken as $M \in [2000 \text{ m/s}, 4000 \text{ m/s}]$ in this example)
4. taking the last element $V_1$ $v_{end}$;
5. evaluating the velocity as $V = (V_1/v_{end}) \cdot M$;
6. taking velocity $V_{salt\ body}$, $V_{salt\ body} \in [M, M = \Delta v]$ randomly for the salt body, where $\Delta v$ is a randomly added velocity value, which is taken as 300 m/s to 500 m/s in this example.

Based on the above solution, it is possible to automatically build a three-dimensional velocity model. Further, the method can be extended to a method for building a tunnel seismic velocity model based on deep learning, which includes:

a tunnel velocity model database building module configured to generate a three-dimensional velocity model in front of a tunnel based on an on-site geological exploration report in a large number and constitute a tunnel velocity model database;

a finite difference forward modeling module: the acoustic wave fluctuation equation can be represented as follows:

$$\frac{\partial^2 u}{\partial x^2} + \frac{\partial^2 u}{\partial y^2} + \frac{\partial^2 u}{\partial z^2} = \frac{\partial^2 \alpha}{v^2(x,y,z)\partial t^2} + f(x,y,z,t)$$

A finite difference method is used to forward simulate the elastic wave fluctuation equation, and the receivers arranged on the tunnel wall are used to receive the amplitude information of seismic waves for further deep learning modeling.

A three-dimensional seismic velocity module built based on deep learning is configured to build a tunnel inversion deep neural network, where an input of the network is seismic observation data under a three-dimensional observation mode, and an output is a predicted velocity model.

Based on the above three-dimensional velocity model, the folded model can be used as a tunnel three-dimensional velocity model by rotating 90° counterclockwise along the central axis.

Figure 6:
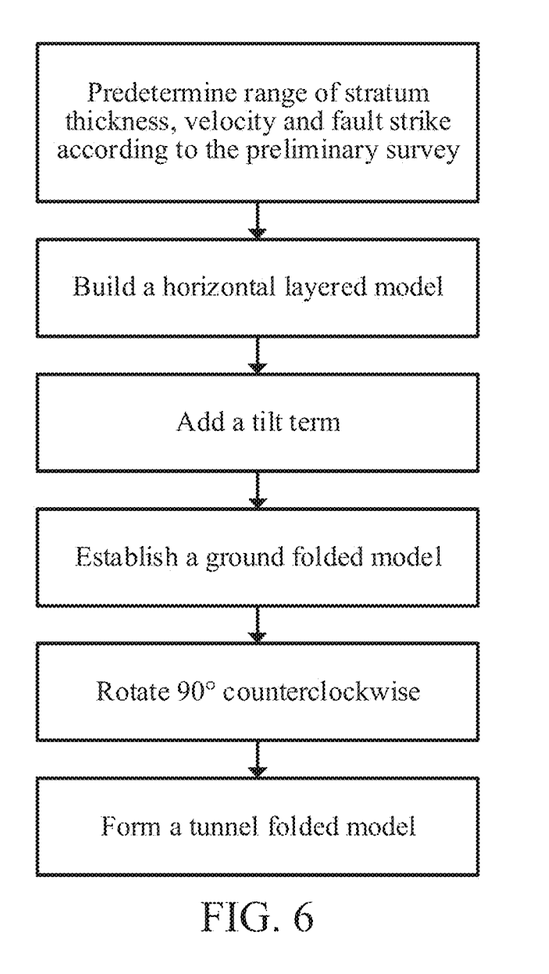
FIG. 6 is a tunnel model modeling flowchart according to an embodiment of the present disclosure.
Figure 7:
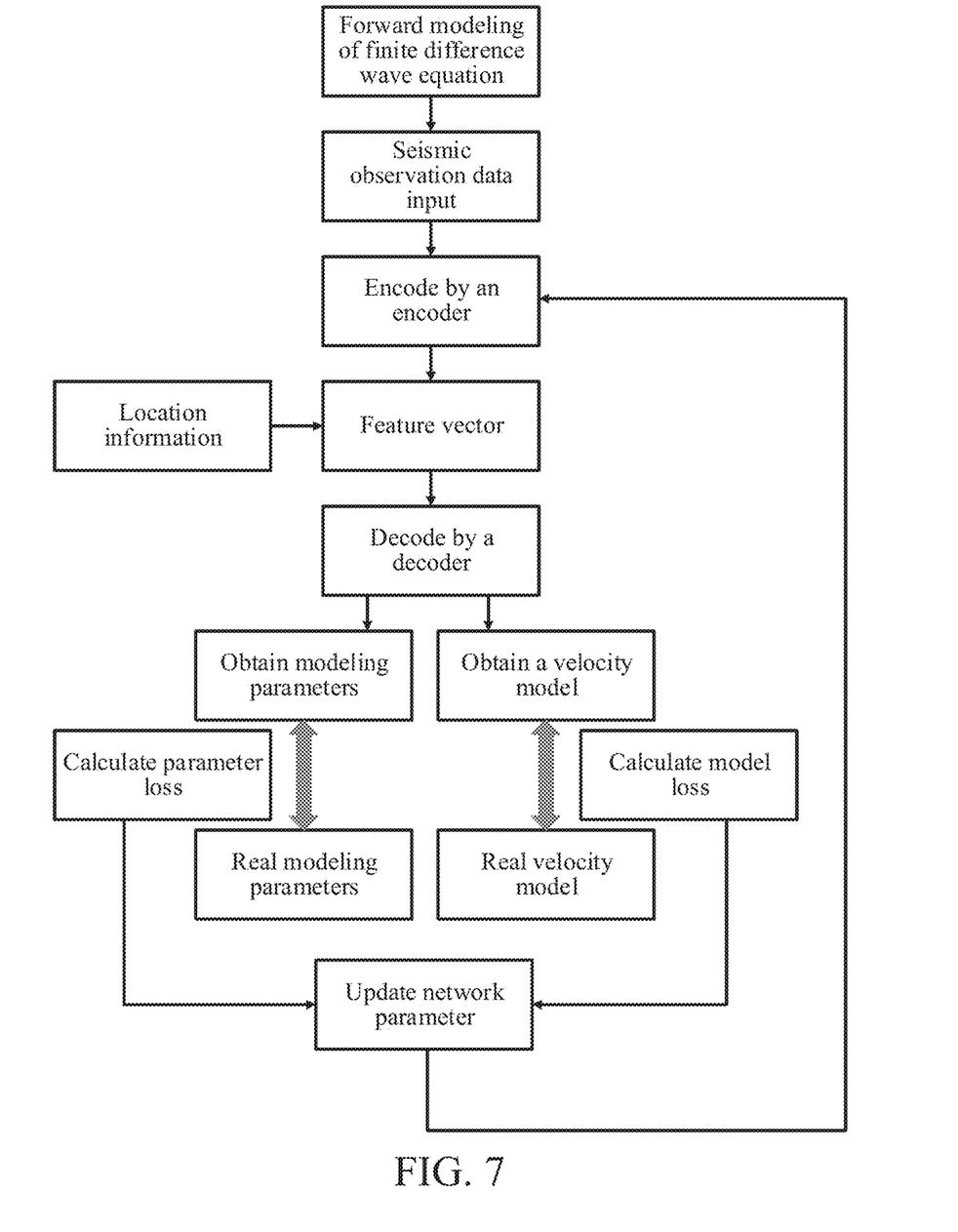
FIG. 7 is a flowchart of a deep learning three-dimensional velocity model method according to an embodiment of the present disclosure.

The tunnel model of this embodiment is shown in FIG. 6. Specifically, as shown in FIG. 7, the tunnel seismic velocity modeling method based on deep learning includes:

Step S1: A database of a three-dimensional velocity model of a tunnel is built, and the embodiment randomly generates a three-dimensional velocity model with a size of 100 m×100 m×100 m using the three-dimensional velocity modeling method provided above for the tunnel, and the model includes folds and faults, where the velocity model does not exceed three lithologic interfaces, and the seismic velocity of a medium in front of the tunnel ranges from 2000 m/s to 4000 m/s. The velocity of tunnel surrounding rock is consistent with that of the first layer medium of the velocity model, Step S2: A finite difference forward simulation is performed, the grid spacing is set to be 1 m, 50 grids are added for sponge absorption boundaries, and finally, the size of the velocity model in the forward simulation of the wave field is [200, 200, 200]. 12 seismic sources and 12 receivers are respectively arranged on a side wall of the tunnel. The seismic source points are evenly distributed at 5 m and 10 m from the working tunnel face, and are divided into three heights with a height difference of 1 m. The receivers are located within the range of 20 m to 60 m from the working tunnel face, with a spacing of 10 m at the same horizontal position. The seismic source dominant frequency is 100 Hz, the unit time step is 0.1 ms, and the total time step is 2000 time steps. In this way, the seismic observation data of each model are generated.

In other examples, the geological model may be built by other such parameters. Receivers and sources may be substituted.

Figure 8:
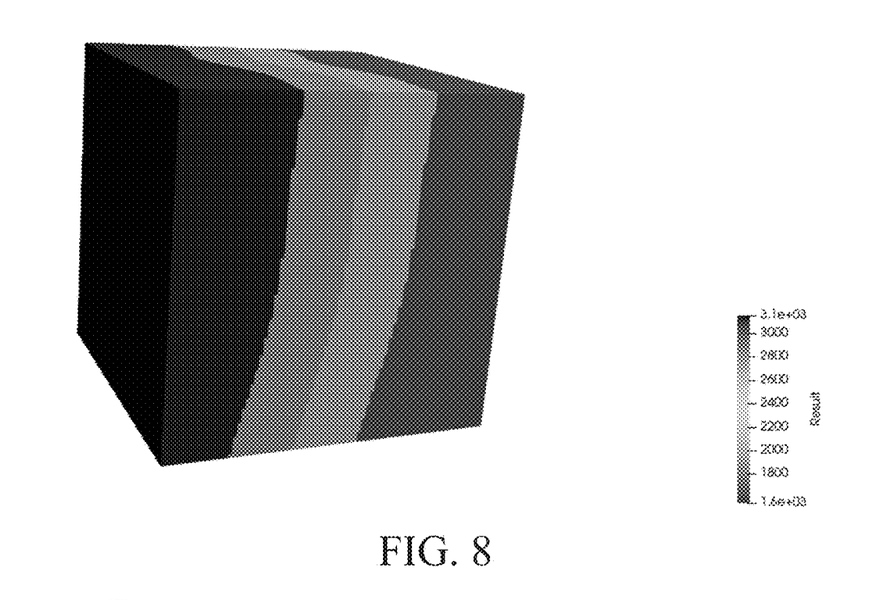
FIG. 8 is a schematic diagram of a tunnel folded model according to an embodiment of the present disclosure.

A geological velocity model in this example database is shown in FIG. 8.

The batch database built in this example includes 10000 tunnel seismic velocity models, which are randomly divided into a training set, a validation set and a test set by a ratio of 8:1:1.

Step S3: A tunnel velocity model built neural network is built, where an input of the network is seismic observation data, the network is input according to Batchsize=8, the size of the input data is [8, 1, 12, 2000], and the output is a three-dimensional tunnel velocity model and three-dimensional velocity modeling parameters; the entire neural network includes one encoder and one decoder. Seismic observation information is input into an encoder module which is a global feature encoder composed of a six-layer convolutional neural network, where the encoder converts an input into a feature vector containing velocity model information, and the size of the output feature vector is [8, 63, 12, 6]; a channel is added to the feature vector, and a receiver corresponding to seismic data and source information is added, i.e., receiver position information $(x_n, y_n, z_n, x, y, z)$, where $x_n$, $y_n$ and $z_n$ represent, the coordinate of the $n^{th}$ source point, and x, y and z represent the coordinate of the geophone. The size of the processed feature vector is [8, 64, 12, 6], and this vector is input into a decoder for decoding; a decoder adding position encoding information includes a five-layer convolutional layer followed by two-layer convolutional layers and a three-layer full-connection layer respectively, and a velocity model and modeling parameters are respectively output.

Regarding the velocity model, after obtaining the corresponding velocity model of the data, the velocity model built by the neural network is compared with the velocity model corresponding to the input seismic data, and the least squares loss function is used to calculate the difference between the two velocity models, and the network is transmitted back to optimize the network parameters.

Regarding the modeling parameters, after obtaining the modeling parameters, the modeling parameters built by the neural network are compared with the modeling parameters corresponding to the input seismic data, and the differences are respectively calculated by using the least squares loss function and the minimum absolute error loss function, and the sum of the two loss functions is added and the gradient return transmission is performed.

Because there are two outputs to optimize the network, in the process of network learning, the weight of the loss function generated by the two outputs is adjusted. In the initial stage of network training, the weights of the modeling parameters are larger and the weights of the velocity model are smaller, and the weights of the velocity model gradually increase as the training progresses.

The least squares loss function can be represented as $$L_m = \|m_{est} - m_{tru}\|^2$$

The minimum absolute error loss function can be represented as:

$$L_m = \|m_{est} - m_{tru}\|^1$$

$m_{est}$ represents a model wave of the model output by the deep neural network for modeling the velocity of the tunnel, and $m_{tru}$ represents an actual geological model in the database of the velocity model of the tunnel.

In the network training process of S3 stage, an Adam optimizer is used, the learning rate is kept constant by $5 \times 10^{-5}$, the BatchSize of network training stage is 8, and the total number of iterations is 150.

Figure 9:
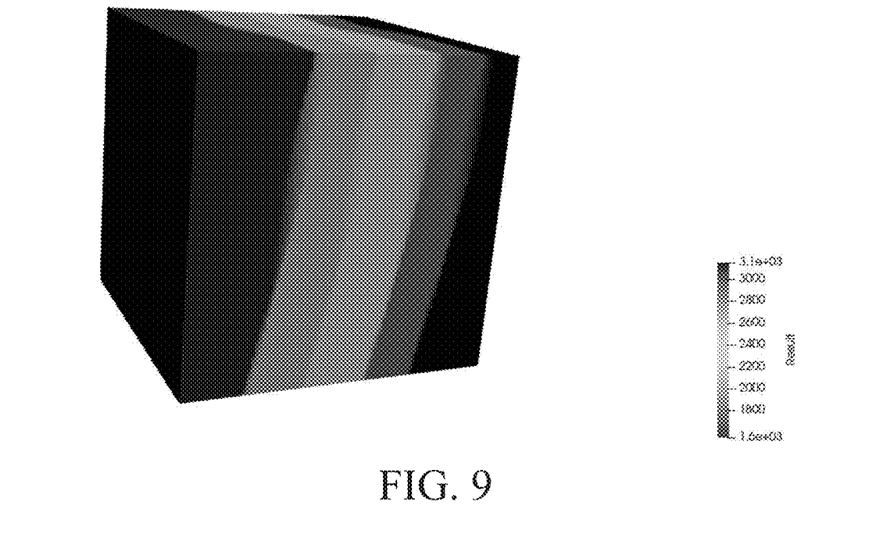
FIG. 9 is a schematic diagram of a deep learning three-dimensional velocity modeling result according to an embodiment of the present disclosure.

In Step S4, the trained funnel velocity constructed neural network is used to test the velocity constructing effect on a test set, and the test result is shown in FIG. 9. The test results show that the three-dimensional tunnel velocity constructed neural network can be well built by neural network.

The primary network parameters and hardware conditions in this embodiment are: calculations are performed using NVIDIARTX3090 GPU*4. Algorithms are written using MATLAB and PYTHON.

The following product examples are further provided:
a computer-readable storage medium having stored therein a plurality of instructions adapted to be loaded by a processor of a terminal device and to perform the method for three-dimensional velocity geological modeling with structures and velocities randomly arranged.

A terminal device including a processor and a computer-readable storage medium, where the processor is used for implementing various instructions; the computer-readable storage medium is used to store a plurality of instructions adapted to be loaded by a processor and to perform the method for three-dimensional velocity geological modeling with structures and velocities randomly arranged.

A person skilled in the art should understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product implemented on one or more computer-usable storage media (including but not limited to a disk memory, a CD-ROM, an optical memory, and the like) including computer-usable program code.

The present disclosure is described with reference to flowcharts and/or block diagrams of the method, device (system), and computer program product in the embodiments of the present disclosure. Computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

The foregoing descriptions are merely exemplary embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

What is claimed is:

1. A method for three-dimensional velocity geological modeling with structures and velocities randomly arranged, comprising:
   determining a base point in a three-dimensional space, building an equation according to the base point to determine a planar layered model, and complicating a tilt layer of the planar layered model to build a fold layer model of a curved surface in the three-dimensional space;
   building a three-dimensional fault folded model based on the three-dimensional surface fold layer model combined with a fault plane of a random reference point and displacement of each point in a global coordinate system;
   building a velocity model containing salt body based on the three-dimensional fault folded model, and simulating salt body intrusion in a geological body of certain depth; and
   performing a random velocity amplitude to realize three-dimensional velocity modeling according to the layered type which has been set and according to the set velocity range and the velocity difference range between each layer of geology;
   the complicating a tilt layer of the planar layered model specifically comprising: the planar layered model is determined by building an equation according to the base points, and the different layer models are divided into different categories; a fluctuation function is built for each point based on the plane model; by adjusting a period and amplitude of a trigonometric function in the fluctuation function, a tilt term is built for the surface, the tilt layer is further complicated, and the fold layer model of the surface in the three-dimensional space is built.

2. The method for three-dimensional velocity geological modeling with structures and velocities randomly arranged according to claim 1, wherein the specific process of building an equation to determine a planar layered model according to the base points comprises:
   an equation is built according to the base points ($X_{ref}$, $Y_{ref}$, $Z_{ref}$) to determine the planar layered model, and the calculation formula is as follows:

$$H(X,Y)=(X-X_{ref})+(Y-Y_{ref})\tan \varphi, \text{ wherein}$$

$\varphi$ represents an angle of tilt.

3. The method for three-dimensional velocity geological modeling with structures and velocities randomly arranged according to claim 1, wherein the specific process comprises:
   a folded model is built based on the planar layered model, and the calculation formula is as follows:

$$S(X,Y) = \begin{cases} A_1 \cos(2\pi H/T_1) - A_1 & H \le \hat{T}_1 \\ A_i \cos(2\pi H/T_i) - A_i & \hat{T}_{i-1} < H \le \hat{T}_i, \\ A_n \cos(2\pi H/T_n) - A_n & H > \hat{T}_{n-1} \end{cases}$$

wherein
   $T_i$, $A_i$ represent the period and amplitude respectively, and the values are randomly taken;
   a tilt term formula for the surface is built as:

$D(X,Y)=b_1(X-X_{ref})+b_2(Y-Y_{ref})$, wherein $X_{ref} Y_{ref}$ are base point coordinates, and the value of $b_1$ $b_2$ is randomly taken.

4. The method for three-dimensional velocity geological modeling with structures and velocities randomly arranged according to claim 1, wherein the specific process of building a three-dimensional fault folded model comprises:
the formula for adding faults to the folded model is as follows:

$c_1(X-X_{ref})+c_2(Y-Y_{ref})+c_3(Z-Z_{ref})=0$, wherein $c_1$ $c_2$ $c_3$ are calculated by a rotation matrix:

$$\begin{bmatrix} c_1 \\ c_2 \\ c_3 \end{bmatrix} = R \begin{bmatrix} 0 \\ 0 \\ 1 \end{bmatrix} = \begin{bmatrix} \cos\phi\sin\theta \\ \sin\phi\sin\theta \\ -\cos\theta \end{bmatrix},$$

a rotation matrix $$R = \begin{bmatrix} \sin\phi & \cos\phi\cos\theta & \cos\phi\sin\theta \\ \cos\phi & -\sin\phi\cos\theta & \sin\phi\sin\theta \\ 0 & \sin\theta & -\cos\theta \end{bmatrix},$$

wherein $\phi\theta$ are randomly taken from $[0,2\pi]$, and for random $d_x$ $d_y$, $D_X$ $D_Y$ $D_Z$
have $$\begin{bmatrix} D_X \\ D_Y \\ D_Z \end{bmatrix} = R \begin{bmatrix} d_x \\ d_y \\ 0 \end{bmatrix} = \begin{bmatrix} d_x\sin\phi + d_y\cos\phi\cos\theta \\ d_y\cos\phi + d_y\sin\phi\cos\theta \\ d_y\sin\theta \end{bmatrix}$$

in the global coordinate.

5. The method for three-dimensional velocity geological modeling with structures and velocities randomly arranged according to claim 1, wherein the specific process of simulating an upward salt body intrusion in a geological body of a certain depth comprises: fitting the intrusion by a two-dimensional Gaussian function, defining the height of vertical intrusion by an amplitude, determining the size by variances, and the direction determining by a clockwise rotation angle; setting an affected area with a certain thickness, the maximum intrusion height being at the bottom stratum, the closer to the surface in the affected area, the smaller the influence, while the stratum above the affected area remains unchanged, completing the addition of a salt body.

6. The method for three-dimensional velocity geological modeling with structures and velocities randomly arranged according to claim 5, wherein the formula for building the salt body is as follows:

$G(X,Y)=A \exp(-(d_1(X-X_{ref})^2+d_3(Y-Y_{ref})^2+2d_2(X-X_{ref})(Y-Y_{ref})))$, wherein $$d_1 = \frac{\cos^2\theta}{2\sigma_X^2} + \frac{\sin^2\theta}{2\sigma_Y^2}, d_2 = -\frac{\sin 2\theta}{4\sigma_X^2} + \frac{\sin 2\theta}{4\sigma_Y^2}, d_3 = \frac{\sin^2\theta}{2\sigma_X^2} + \frac{\cos^2\theta}{2\sigma_Y^2}$$

A represent the height of a vertical intrusion of the salt body, and the size of the salt body is controlled by $\sigma_X^2$ $\sigma_Y^2$; an affected area of the salt body is set as $[A_{max}+5, A_{max}+15]$, wherein $A_{max}$ represents the maximum intrusion height; in the affected area, the shallower the layer, the smaller the amplitude A of the corresponding Gaussian function, and the stratum above the affected area remains unchanged.

7. The method for three-dimensional velocity geological modeling with structures and velocities randomly arranged according to claim 1, wherein the specific process of performing a random velocity amplitude to achieve three-dimensional velocity modeling comprises:
generating a vector V of n+1 elements randomly according to the number of layers n;
generating a vector $V_1$ by accumulating the vector V';
taking a random velocity reference value M, $M \in [x_1, x_2]$ and $x_1, x_2$ as the upper and lower bounds of velocity;
taking the last element $v_{end}$ $V_1$;
evaluating the velocity as $V=(V_1/v_{end})\cdot M$; and
taking velocity $V_{salt\ body}$, $V_{salt\ body} \in [M, M+\Delta v]$ randomly for the salt body, wherein $\Delta v$ is a randomly added velocity value.

8. The method for three-dimensional velocity geological modeling with structures and velocities randomly arranged according to claim 1, wherein in the process of three-dimensional velocity modeling, the earth surface folded model is rotated by 90° counterclockwise along a central axis to determine fault strike, stratum thickness and velocity distribution range planned according to geological conditions from a geological survey report before tunneling, and the weight of the modeling parameters in different ranges is set.

9. The method for three-dimensional velocity geological modeling with structures and velocities randomly arranged according to claim 1, wherein the method for three-dimensional velocity geological modeling with structures and velocities randomly arranged further comprises acquiring a tunnel seismic record, performing feature extraction processing on the tunnel seismic record using a convolutional neural network, and adding tunnel receiver position information on an additional channel to complete data encoding.

10. The method for three-dimensional velocity geological modeling with structures and velocities randomly arranged according to claim 9, wherein a convolutional neural network is used to decode the encoded data, multi-objective learning is performed, and a three-dimensional velocity model and three-dimensional velocity modeling parameters are obtained by respectively processing the decoding results of the decoder using a convolutional neural network and a fully connected neural network.

11. The method for three-dimensional velocity geological modeling with structures and velocities randomly arranged according to claim 1, wherein in the process of building a velocity model, the loss function used comprises a velocity model loss function and a modeling parameter loss function, wherein the velocity model loss function is used for fitting a real three-dimensional velocity model corresponding to the observation data and a network modeling three-dimensional velocity model; the modeling parameter loss function is used to fit the real three-dimensional velocity model modeling parameters corresponding to the observation data with the network modeling parameters.

12. A computer-readable storage medium, comprising: the computer-readable storage medium storing therein a plurality of instructions adapted to be loaded by a processor of a terminal device and to perform the method for three-dimensional velocity geological modeling with structures and velocities randomly arranged according to claim 1.

13. A terminal device, comprising: a processor and a computer-readable storage medium, the processor using for implementing a plurality of instructions; the computer-readable storage medium using for storing a plurality of instructions adapted to be loaded by a processor and to perform the method for three-dimensional velocity geological modeling with structures and velocities randomly arranged according to claim 1.

\* \* \* \* \*